US012697800B2

(12) United States Patent
Kirchhoff

(10) Patent No.: US 12,697,800 B2
(45) Date of Patent: Aug. 4, 2026

(54) MULTILAYER PLATE

(71) Applicant: VARIOWELL DEVELOPMENT GMBH, Muenster (DE)

(72) Inventor: Tobias Kirchhoff, Muenster (DE)

(73) Assignee: Variowell Development GmbH, Muenster (DE)

( * ) Notice: Subject to any disclaimer, the term of this patent is extended or adjusted under 35 U.S.C. 154(b) by 774 days.

(21) Appl. No.: 17/874,860

(22) Filed: Jul. 27, 2022

(65) Prior Publication Data

US 2022/0355571 A1      Nov. 10, 2022

Related U.S. Application Data

(63) Continuation-in-part of application No. 17/244,176, filed on Apr. 29, 2021, now abandoned.

(51) Int. Cl.
| | |
|---|---|
| *B32B 9/04* | (2006.01) |
| *B32B 5/18* | (2006.01) |
| *B32B 7/027* | (2019.01) |
| *B32B 15/04* | (2006.01) |
| *B32B 15/18* | (2006.01) |
| *B32B 15/20* | (2006.01) |

(52) U.S. Cl.
CPC ................ *B32B 7/027* (2019.01); *B32B 5/18* (2013.01); *B32B 9/041* (2013.01); *B32B 9/046* (2013.01); *B32B 15/046* (2013.01); *B32B 15/18* (2013.01); *B32B 15/20* (2013.01); *B32B 2266/0278* (2013.01); *B32B 2307/302* (2013.01)

(58) Field of Classification Search
None
See application file for complete search history.

(56) References Cited

U.S. PATENT DOCUMENTS

| | | | |
|---|---|---|---|
| 2011/0000018 A1* | 1/2011 | Kirchhoff | ............ A47C 27/148 |
| | | | 219/490 |
| 2017/0323780 A1 | 11/2017 | Shin et al. | |
| 2019/0101960 A1* | 4/2019 | Silvanto | .................. G06F 1/181 |
| 2020/0269543 A1 | 8/2020 | Yang et al. | |
| 2021/0068304 A1* | 3/2021 | Strader | .................. F28F 21/02 |

FOREIGN PATENT DOCUMENTS

| | | |
|---|---|---|
| CN | 204968327 U | 1/2016 |
| CN | 206245502 U | 6/2017 |
| CN | 206374263 U | 8/2017 |
| DE | 102006056988 A1 | 4/2008 |
| WO | 2018067104 A1 | 4/2018 |

* cited by examiner

*Primary Examiner* — Kim S. Horger

(74) *Attorney, Agent, or Firm* — Hudak, Shunk & Farine Co. LPA

(57) ABSTRACT

A multilayer plate is disclosed which includes three layers. A carbon layer is covered by a metallic layer, and a substrate layer is covered at least partially by the carbon layer and the metallic layer. The metallic layer includes a first zone and a second zone. The first zone is a zone defined by the carbon layer and the second zone is a zone defined by carbon layer-free zone. The substrate layer is made of a polyurethane flexible foam. The first zone has a higher thermal conductivity as the second zone. The multilayer plate can be used as a demonstration display for demonstrating the different thermal conductivity in the first zone compared to the second zone to a consumer.

14 Claims, 3 Drawing Sheets

100

MULTILAYER PLATE

CROSS REFERENCE

This application is a continuation-in-part of U.S. application Ser. No. 17/244,176, filed Apr. 29, 2021 entitled "Multilayer Plate" herein fully incorporated by reference.

FIELD OF THE INVENTION

The field of the invention concerns a multilayer plate with a sensitive upper surface.

BACKGROUND OF THE INVENTION

Multilayer plates comprising a plurality of layers with different properties are known in the art. For example, a multilayer plate is disclosed by the Chinese Utility Model CN 206245502 U. The multilayer plate comprises a protective layer, a fireproofing layer, a graphite fibre layer, a foamed aluminium layer, and a base layer which are bonded together by a bonding layer. The base layer is a fibre-reinforced resin layer and the protective layer is a PET (polyethylene terephthalate) layer.

A natural graphite/aluminium composite heat sink is disclosed by the Chinese Utility Model CN 204968327 U. The heat sink comprises an aluminium foil layer and a graphite layer on the upper side and lower side of the aluminium foil layer. The aluminium foil layer comprises an aluminium substrate with a roughened layer on the upper side and the lower sides of the aluminium substrate. A surface of the aluminium foil layer is uniformly distributed with holes and the roughened layer is engaged with the graphite layer through the holes.

The Chinese utility CN 206374263 U model discloses a refractory graphite sheet comprising a graphite substrate and a plurality of folded sheets arranged side by side. The folded sheets have a heat dissipation pitch and are partially folded and overlapped by the graphite substrate. The outer surface of the graphite substrate comprises a protective film layer, a foam buffer layer, a first adhesive layer, a metal aluminium layer, a second adhesive layer, and a first graphite layer.

The German patent application No. DE 10 2006 056988 A1 describes a heat transfer composite including a plurality of pyrolytic graphite parts present in an amount greater than about 50% by volume of the heat transfer composite and a non-carbonaceous matrix holding the pyrolytic graphite parts in a consolidated mass. The matrix can be made of Aluminum.

The international patent application No. WO 2018/067104 A1 describes a multilayer housing including a first continuous layer comprising copper, plastic, graphene, aluminum, titanium, magnesium, or combinations thereof, a void layer on the first continuous layer, and a second continuous layer on the void layer.

The US patent application No. US 2020/269543 A1 describes a thermal insulation structure including a base plate and a thermal insulation component. The thermal insulation component is disposed on the base plate and is made of aerogel. The material of the base plate includes, for example, metal, that has a high thermal conductivity, such as copper or aluminum.

The US patent application No. US 2017/323780 A1 describes a thermally conductive sheet including a first graphite sheet and a second graphite sheet. The second graphite sheet is any of a second graphite sheet disposed to entirely overlap the first graphite sheet, a second graphite sheet disposed to partially overlap and to be shifted from the first graphite sheet, and a second graphite sheet disposed such that there is an interval of less than 5 mm between the second graphite sheet and the first graphite sheet. The graphite sheets are sandwiched between metal layers.

The prior art does not teach a multilayer plate with a sensitive upper surface which has different zones with different degrees of thermal conduction.

SUMMARY OF THE INVENTION

The present document describes a multilayer plate which comprises three layers. A carbon layer is covered by a metallic layer, and a substrate layer is covered at least partially by the carbon layer and the metallic layer. The metallic layer comprises a first zone and a second zone. The first zone is a zone defined by the carbon layer and the second zone is a zone defined by carbon layer-free zone. The substrate layer is made of polyurethane flexible foam.

A cooling effect is generated at the metallic layer when a hand is placed in the first zone compared to when the hand is placed in the second zone. This cooling effect is a result of the polyurethane flexible foam being a thermal insulator and therefore providing slower conduction of the heat in the second zone compared to the conduction of the heat in the first zone by the graphite layer.

In an aspect the carbon layer is a graphite plate with a thickness in a range of 2 millimeters and 4 millimeters. A thicker carbon layer has more capacity to absorb thermal energy than a thinner carbon layer.

The carbon layer can be made from different graphite composition and in one aspect is made from one of a highly oriented pyrolytic graphite or a super-oriented graphite. These specific graphite compositions are beneficial the cooling effect felt by contact by a user with the multilayer plate.

In an aspect, the metallic layer has a thickness in a range of 0.05 millimeters to 0.1 millimeters. The metallic layer is a foil or film made of at least one of aluminium, copper or steel. The metallic layer covers and protects the carbon layer, the substrate layer and a frame surrounding the multilayer plate.

In an aspect, the polyurethane flexible foam has one of a density in a range of 40 kilograms/square-meter to 50 kilograms/square-meter or a firmness in a range of 5.0 kilopascals to 9.0 kilopascals. If the substrate layer is very soft, the metallic layer might be destroyed if the user applies too much external force onto the surface of the multilayer plate.

In an aspect the multilayer plate comprises a frame surrounding the substrate layer and partially the carbon layer. The frame holds the substrate layer and the carbon layer in place and ensures a rigid structure.

In an aspect the metallic layer is affixed on a circumferential surface of the frame. Hence, the metallic layer is affixed only on the circumferential surface. Furthermore, the metallic layer, carbon layer and substrate layer remain flexible relative to each other when the external force is applied, for example by the user.

In an aspect a first space between the carbon layer and the metallic layer in the first zone does not comprise any solid material or liquid material which would influence the thermal conductivity.

In an aspect, a second space between the substrate layer and the metallic layer in the second zone also does not comprise any solid material or liquid material would influence the thermal conductivity.

In an aspect the first zone has a higher thermal conductivity than the second zone. The thermal energy is absorbed by the layers of the first zone in a higher amount than the layers in the second zone.

In an aspect the multilayer plate further comprises an additional layer made of corrugated board. The additional layer is arranged next to the carbon layer and the second zone is a zone defined by the additional layer.

The present document describes further a use of the multilayer plate as a demonstration display for demonstrating a differential thermal conductivity in the first zone compared to the second zone. The user can touch the first zone with the palm of one hand and the second zone with the palm of the other hand at the same time or in succession. The difference of the thermal conductivity in the two zones is felt by a cooler first zone and a warmer second zone.

The present document describes further a demonstration display for demonstrating a differential thermal conductivity in a first zone or a second zone comprising the multilayer plate. The multilayer plate comprises a carbon layer, covered by a metallic layer a substrate layer, covered at least partially by the carbon layer and the metallic layer, and wherein the metallic layer comprises the first zone and the second zone and wherein the first zone is a zone defined by the carbon layer and the second zone is a zone defined by carbon layer-free zone. The substrate layer is made of polyurethane flexible foam.

The present document describes further a method for demonstrating a differential thermal conductivity in a first zone or a second zone of a multilayer plate. In a first step one or more body parts is/are placed on one of the first zone or the second zone. In a second step, a same one or a different one of the one or more body parts is/are placed on a different one of the first zone or the second zone of step one. In a third step, the effect of the placing of the one or more body parts on the first zone and the second zone is compared. The multilayer plate comprises a carbon layer, covered by a metallic layer, a substrate layer, covered at least partially by the carbon layer and the metallic layer, and wherein the metallic layer comprises the first zone and the second zone and wherein the first zone is a zone defined by the carbon layer and the second zone is a zone defined by carbon layer-free zone. The substrate layer is made of polyurethane flexible foam.

The present document further describes a multilayer plate with a carbon layer and an additional layer made of a corrugated board and arranged next to the carbon layer. The multilayer plate further comprises a metallic layer covering the carbon layer and the additional layer. The metallic layer comprises a first zone and a second zone. The first zone is a zone defined by the carbon layer and the second zone is a zone defined by the additional layer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying figures.

DETAILED DESCRIPTION OF THE INVENTION

The invention will now be described based on the figures. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
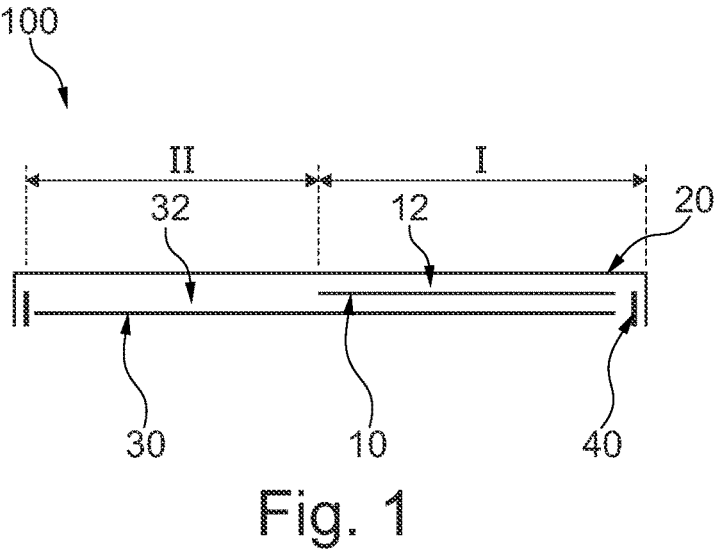
FIG. 1 illustrates a schematic cross-sectional view of a multilayer plate.

FIG. 1 is a schematic cross-sectional view of a multilayer plate 100. The multilayer plate 100 comprises a carbon layer 10, a metallic layer 20 and a substrate layer 30. The substrate layer 30 is partially covered by the carbon layer 10. The substrate layer 30 and the carbon layer 10 are surrounded by a frame 40. The frame 40 is affixed to the substrate layer 30 by one of an adhesive or a fastener. The frame 40 holds the substrate layer 30 and the carbon layer 10 in place and ensures that the carbon layer 10 stays in position relative to the substrate layer 30.

The substrate layer 30 and the carbon layer 10 are covered by the metallic layer 20. The metallic layer 20 comprises a first zone I and a second zone IL The first zone I is a zone defined by the carbon layer 20. The second zone II is a zone defined by a carbon layer-free zone. The first zone I defines a first space 12 between the carbon layer 10 and the metallic layer 20. The second zone II defines a second space 32 between the substrate layer 30 and the metallic layer 20. Both of the first space 12 and the second space 32 do not comprise any solid material or liquid material.

Figure 2:
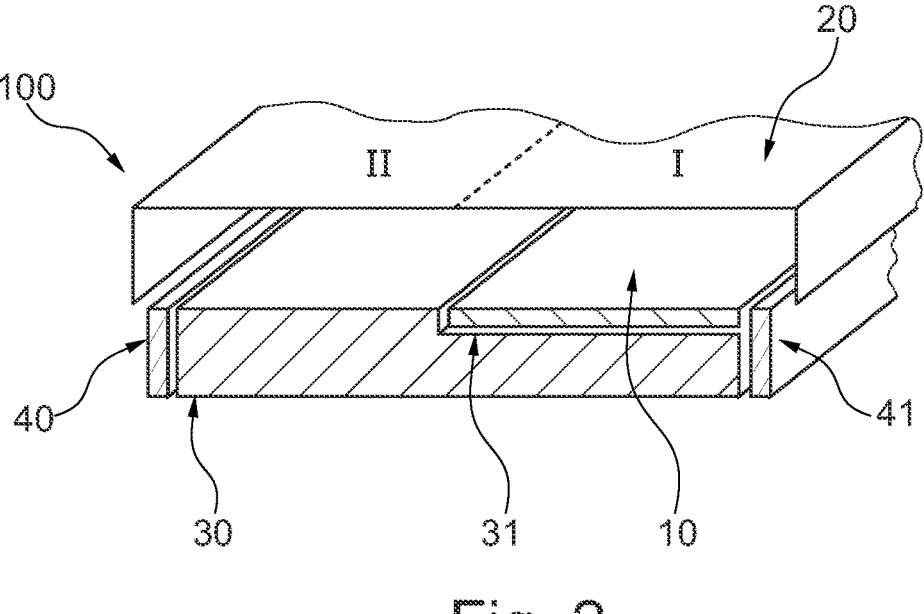
FIG. 2 illustrates an exploded cross-sectional view of the multilayer plate of FIG. 1.

FIG. 2 is an exploded cross-sectional view of a part of the multilayer plate 100. The substrate layer has a recess 31 to accommodate the carbon layer 10. The recess 31 has the same thickness as the carbon layer 10. The metallic layer 20 covers the carbon layer 10, the substrate layer 30 and the frame 40. The metallic layer 20 is affixed on a circumferential surface 41 of the frame 40. The metallic layer 20 can be affixed to the circumferential surface 41 by one of an adhesive or a fastener.

The substrate layer 30 is made of a foam. In an aspect the substrate layer 30 is a polyurethane flexible foam. A property of the polyurethane flexible foam is its excellent thermal insulation. The polyurethane flexible foam may comprise different densities and firmnesses. In an aspect the substrate layer 30 comprises a density in a range of 20 kilograms/square-meter to 80 kilograms/square-meter. In another aspect the substrate layer 30 comprise a density in a range of 40 kilograms/square-meter to 50 kilograms/square-meter. In an aspect the substrate layer 30 comprises a firmness in a range of 2.0 kilopascals to 14.0 kilopascals. In another aspect the substrate layer 30 comprises a firmness in a range of 5.0 kilopascals to 9.0 kilopascals.

The carbon layer 10 comprises one of a graphite plate or a steel plate. If the carbon layer 10 is a graphite plate, the graphite plate comprises one of a highly oriented pyrolytic graphite or a super-oriented graphite. Highly oriented pyrolytic graphite is a highly pure and ordered form of synthetic graphite, which is characterised by a low mosaic spread angle, meaning that the individual graphite crystallites are well aligned with each other. The super-oriented graphite is similar to the highly oriented pyrolytic graphite with a more in-plane orientation of the graphite.

One property of graphite is its high thermal conductivity. The high thermal conductivity of the carbon layer 10 generates a cooling effect in the first zone I compared to the substrate layer 30 in the second zone II. Consequently, the first zone I has a higher thermal conductivity as the second zone II. When a user touches the first zone I of the metallic layer 20 with the palm of a hand, the heat of the hand is conducted away from the carbon layer 10 (thermal conductivity) which the user feels as a cooling effect. If, on the other hand, the user touches the second zone II of the metallic layer 20, the heat from the palm of the hand is only very slowly conducted away from the substrate layer 30 (thermal insulation) and a warming effect because of the body heat connecting with the metallic layer is noticeable.

The carbon layer 10 has a thickness of at least 1.5 millimeters. In an aspect the thickness of the carbon layer 10 is in a range of 2 millimeters and 4 millimeters. If the carbon layer 10 has a thickness of 4 millimeters, the cooling effect lasts longer than if the carbon layer 10 would have a thickness of 2 millimeters. The cooling effect will last longer if the thickness of the carbon layer 10 is larger because a thicker carbon layer 10 has more capacity to absorb thermal energy than a thinner carbon layer 10.

The metallic layer 20 is one of an aluminium foil, a copper foil or a steel foil. To cover and protect the carbon layer 10, the substrate layer 30 and the frame 40, the metallic layer 20 has characteristics such as good formability, low chemical sensitivity, low air and moisture permeability, a good thermal conductivity and a good cleanability. In an aspect the metallic layer 20 comprises a thickness in a range of 0.03 millimeters to 0.15 millimeters. In another aspect the metallic layer 20 has a thickness in a range of 0.05 millimeters to 0.1 millimeters.

In an aspect the metallic layer 20 comprises an imprint such as for example a sign or a message, indicative of where to place the palm of the hand(s) on the metallic layer 20 for noticing a maximum cooling effect.

The multilayer plate 100 can be used for various purposes. In an aspect the multilayer plate 100 is used as a demonstration display for demonstrating the different thermal conductivity in the first zone I compared to the second zone II to the consumer. In this respect, the multilayer panel 100 must have certain dimensions to accommodate the palms of the consumers.

Figure 3:
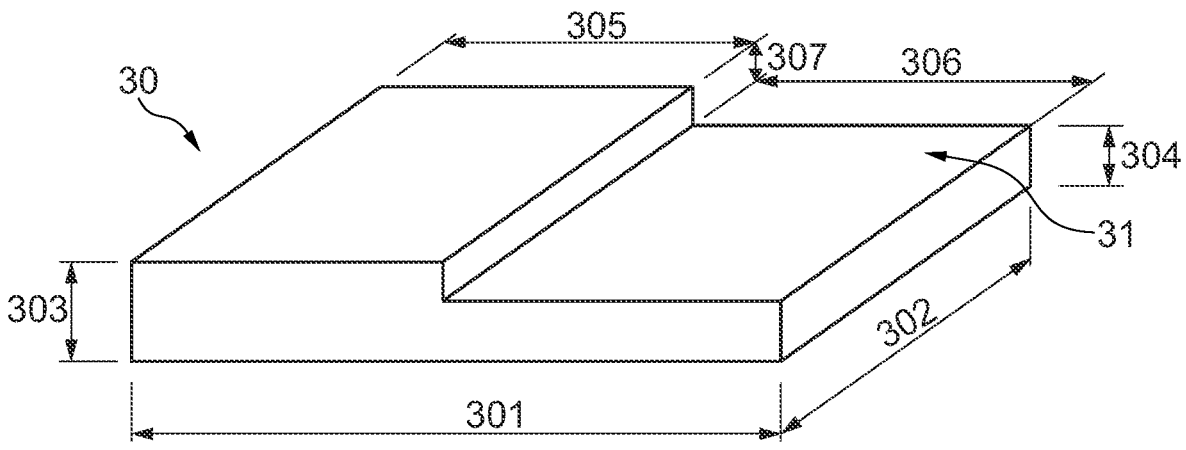
FIG. 3 illustrates a schematic view of a substrate layer.

FIG. 3 illustrates a schematic view of an example of the substrate layer 30 of the demonstration display. The substrate layer 30 comprises different dimensions 301, 302, 303, 304, 305, 306 and 307. For example, the recess 31 for the carbon layer 10 has a surface defined by the dimensions 302 and 306, and a height defined by 307. In one example, the substrate layer 30 has the following values for the dimensions 301, 302, 303, 304, 305, 306 and 307, but these values are not limiting of the invention:

| dimension | value |
|---|---|
| 301 | 288 mm |
| 302 | 212 mm |
| 303 | 37 mm |
| 304 | 33 mm |
| 305 | 138 mm |

-continued

| dimension | value |
|---|---|
| 306 | 150 mm |
| 307 | 4 mm |

In an aspect the multilayer plate 100 is used as component of an assembly wherein different thermal properties of the first zone I and the second zone II are desired.

A further example of the use of the assembly with the multilayer plate 10 is in a temperature regulating device which is used to regulate the temperature of a container for serving a food dish. The food dishes are not just hot or cold but may need a precise temperature before, during or after serving of food from the food dish. The temperature of the serving dish is a factor when serving, for example, tea based on Japanese customs. The temperature chosen is often a medium setting between hot and cold and is commonly reached by heating up the container or food dish and letting the container or food dish cool down again over a (long-lasting) period of time.

The multilayer plate 100 of the assembly provides the first zone I and the second zone II, which comprise two different zones with differing cooling strengths. The cooling strength of the first zone I is higher than the cooling strength of the second zone II. If a hot food dish or a container with a hot dish is placed on the first zone I, the hot food dish or container will cool down faster. On the other hand, the hot food dish or the container with the hot food dish placed on the second zone will cool down slower. Shifting the container or the food dish from the first zone I to the second zone II, or vice versa, will influence the cooling-down process of the container or the food dish. For example, after the food dish is cooked and has a high temperature, the food dish could be placed directly on or in the container on the first zone I of the assembly to reach a first desired temperature. When the first desired temperature is reached, the food dish or the container with the food dish could be shifted to the second zone II until a second desired temperature is reached. The first desired temperature could be, for example, a temperature which stops the cooking process, and the second desired temperature could be, for example, a serving temperature.

In an aspect the metallic layer 20 of the assembly comprises an imprint such as a sign or a message, indicative of where to place the dish or container with the food dish on the metallic layer 20 for the higher or lower cooling-down strength.

In an aspect, the metallic layer 20 comprises a thermochromic imprint to indicate a specific temperature.

Figure 4:
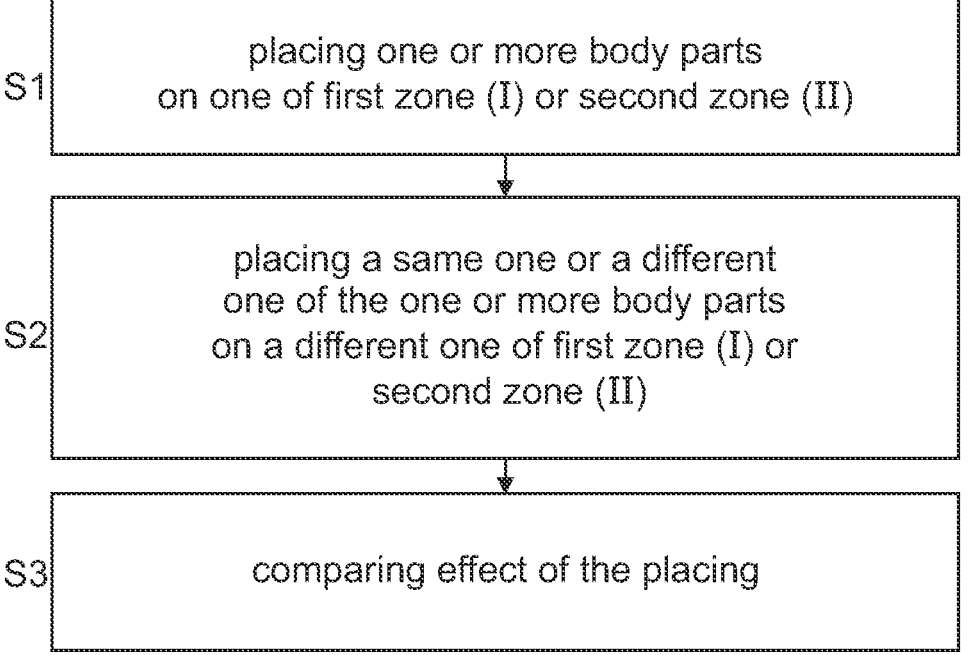
FIG. 4 illustrates a flow-chart of a method for demonstrating a differential thermal conductivity in a first zone or a second zone of the multilayer plate.

FIG. 4 illustrates a flow-chart of a method for demonstrating a differential thermal conductivity in the first zone I or the second zone II of the multilayer plate 100. In a first step S1 one or more body parts of the user is/are placed on one of the first zone I or the second zone II of the multilayer plate 100. In a second step S2 the same one or a different one of the one or more body parts is/are placed on a different one of the first zone I or the second zone II of the multilayer plate 100. In a third step S3 an effect of the placing of the one or more body parts on the first zone I and the second zone II is compared. The effect of the placing is, for example, the cooling effect of the first zone I compared to the second zone II, but this is not limiting of the invention.

Figure 5:
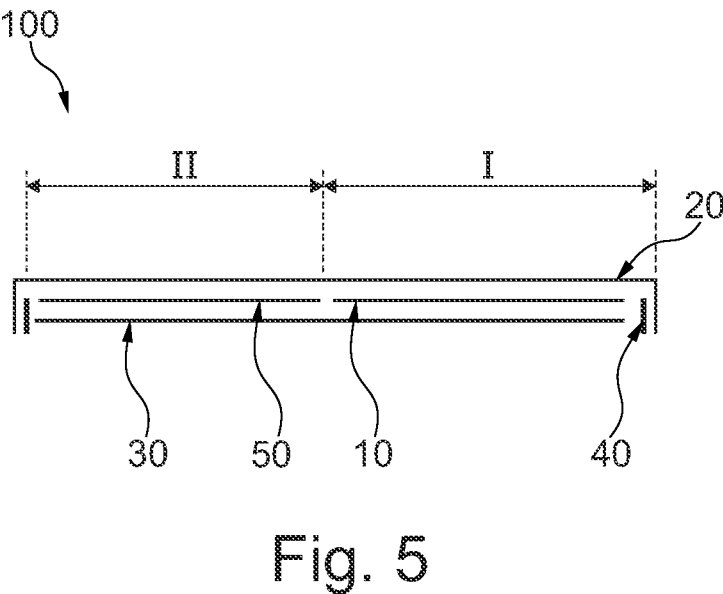
FIG. 5 illustrates a schematic cross-sectional view of another aspect of a multilayer plate.

FIG. 5 illustrates a schematic cross-sectional view of another aspect of a multilayer plate 100. The same reference signs are used as for the multilayer plate 100 of FIG. 1 and similar features are not described in detail. The multilayer plate 100 further comprises an additional layer 50 defining the second zone II. The additional layer 50 is arranged besides the carbon layer 10 and between the substrate layer 30 and the metallic layer 20. The additional layer 50 is made of cardboard or corrugated board but can alternatively be made of any other material providing similar rigidity and thermal conductivity as the cardboard or corrugated board. The additional layer 50 provides higher rigidity than the substrate layer 30 that is made of, for example, flexible foam. The metallic layer 20 is therefore better supported and is subject to less deformation if touched by a user. The risk of damage to the metallic layer 20 such as creases or dents due to deformation is therefore reduced by the additional layer 50. The additional layer 50 further provides low thermal conductivity and does therefore not reduce the cooling effect in the first zone I compared to the second zone II felt by a user.

Figure 6:
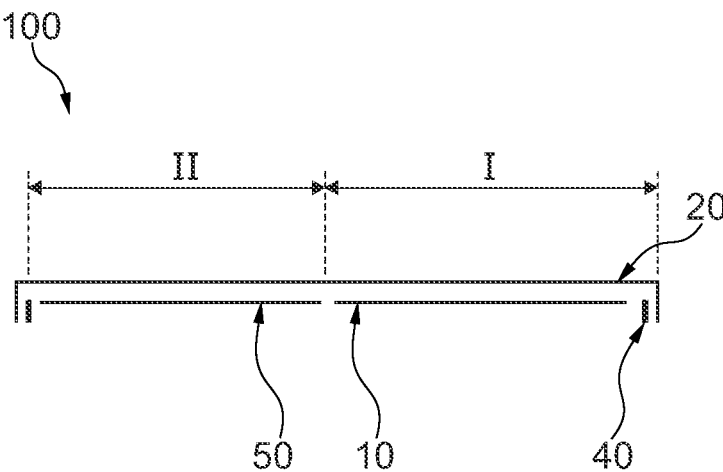
FIG. 6 illustrates a schematic cross-sectional view of another aspect of a multilayer plate.

FIG. 6 illustrates a schematic cross-sectional view of yet another aspect of a multilayer plate 100. The same reference signs are used as for the multilayer plate 100 of FIG. 5 and similar features are not described in detail. The multilayer plate 100 does not comprise a substrate layer 30. The low thermal conductivity of the additional layer 50 together with the high thermal conductivity of the carbon layer 10 provides the cooling effect in the first zone I compared to the second zone II felt by a user. An additional substrate layer 30 is not necessary in this configuration of the multilayer plate 100.

REFERENCE NUMBERS

100 multilayer plate
10 carbon layer
12 first space
20 metallic layer
32 second space
30 substrate layer
31 recess
40 frame
41 circumferential surface
50 additional layer
I first zone
II second zone
301, 302, 303, 304, 305, 306, 307 dimensions
S1, S2, S3 steps
What is claimed is:

1. A multilayer plate, comprising:
a carbon layer, covered by a metallic layer,
a substrate layer, covered at least partially by the carbon layer and the metallic layer, wherein the metallic layer comprises a first zone and a second zone and wherein the first zone is a zone defined by the carbon layer and the second zone is a zone defined by carbon layer-free zone;
wherein the substrate layer is made of a polyurethane flexible foam,
wherein the substrate layer has a recess to accommodate the carbon layer, and
wherein a first space between the carbon layer and the metallic layer in the first zone is a void.

2. The multilayer plate according to claim 1, wherein the carbon layer is a graphite plate with a thickness in a range of 2 millimeters and 4 millimeters.

3. The multilayer plate according to claim 1, wherein the graphite plate comprises one of a highly oriented pyrolytic graphite or a super-oriented graphite.

4. The multilayer plate according to claim 1, wherein the metallic layer has a thickness in a range of 0.05 millimeters to 0.1 millimeters.

5. The multilayer plate according to claim 1, wherein the metallic layer is one of an aluminum foil, a copper foil or a steel foil.

6. The multilayer plate according to claim 1, wherein the polyurethane flexible foam has one of a density in a range of 40 kilograms/square-meter to 50 kilograms/square-meter or a firmness in a range of 5.0 kilopascals to 9.0 kilopascals.

7. The multilayer plate according to claim 1, further comprising a frame surrounding the substrate layer and at least partially the carbon layer for holding the substrate layer and the carbon layer in place.

8. The multilayer plate according to claim 1, wherein the metallic layer is affixed on a circumferential surface of a frame.

9. The multilayer plate according to claim 1, wherein a second space between the substrate layer and the metallic layer in the second zone is a void.

10. The multilayer plate according claim 1, wherein the first zone has a higher thermal conductivity as the second zone.

11. The multilayer plate according to claim 1, further comprising an additional layer made of corrugated board and arranged next to the carbon layer, wherein the second zone is a zone defined by the additional layer.

12. A method for demonstrating a differential thermal conductivity in the first zone or the second zone of the multilayer plate according to claim 1, comprising:
placing one or more body parts on one of the first zone or the second zone;
placing a same one or a different one of the one or more body parts on a different one of the first zone or the second zone; and
comparing the effect of the placing of the one or more body parts on the first zone and the second zone,
wherein the multilayer plate comprises a carbon layer, covered by a metallic layer,
a substrate layer, covered at least partially by the carbon layer and the metallic layer, and wherein the metallic layer comprises the first zone and the second zone and wherein the first zone is a zone defined by the carbon layer and the second zone is a zone defined by carbon layer-free zone;
wherein the substrate layer is made of a polyurethane flexible foam.

13. A multilayer plate, comprising:
a carbon layer;
an additional layer made of corrugated board and arranged next to the carbon layer; and
a metallic layer covering the carbon layer and the additional layer;
wherein the metallic layer comprises a first zone and a second zone,
wherein the first zone is a zone defined by the carbon layer and the second zone is a zone defined by the additional layer, and
wherein a first space between the carbon layer and the metallic layer in the first zone is a void.

14. A multilayer plate, comprising:
a carbon layer, covered by a metallic layer,
a substrate layer, covered at least partially by the carbon layer and the metallic layer, wherein the metallic layer comprises a first zone and a second zone and wherein the first zone is a zone defined by the carbon layer and the second zone is a zone defined by carbon layer-free zone;

wherein the substrate layer is made of a polyurethane flexible foam, wherein a first space between the carbon layer and the metallic layer in the first zone is a void, and wherein a second space between the substrate layer and the metallic layer in the second zone is a void.

* * * * *